3,112,323
METHOD FOR THE PREPARATION OF
CODEINONE FROM THEBAINE
François Krausz, Sceaux, France, assignor to Sempa-
Chimie, Paris, France, a company of France
No Drawing. Filed Jan. 17, 1962, Ser. No. 166,919
Claims priority, application France Jan. 25, 1961
12 Claims. (Cl. 260—285)

This invention relates to a method for the preparation of codeinone from thebaine.

Thebaine is an alkaloid which is present in a relatively substantial amount in opium but which is hardly ever directly used therapeutically. The only substantial industrial uses of thebaine are its conversion into other products which are themselves used for their therapeutic properties. In fact, a considerable part of the thebaine extracted from or present in opium remains unused.

On the other hand, there is a considerable therapeutic use for codeine and there is a close structural relationship between thebaine and codeine, the formula for thebaine being:

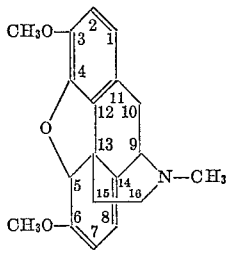

These considerations have induced researchers to try to convert thebaine into codeinone which has the formula:

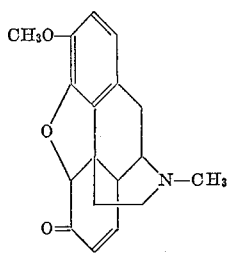

the conversion of codeinone into codeine then being effected relatively easily by reducing the keto group of codeinone to a hydroxyl group.

However, the attempts made heretofore have not been very successful. The work carried out by Knorr and Hörlein [Ber. 39, 1412, 1413 (1906)] and by Schöpf and Hirsch [Lieb. Ann. 429,224 (1931)], is well known, and they have given an account of the preparation of codeinone by the acid hydrolysis of thebaine; this, however, was a purely theoretical work, since the codeinone was obtained only in an insignificant yield. More recently, Conroy published a method of converting thebaine into codeinone [J. Am. Chem. Soc. 77, 5960 (1955)], which, although very elegant, has major disadvantages as regards its industrial performance owing to the number of stages and their difficulty.

The present invention provides a method for the preparation of codeinone which comprises treating thebaine with a hydrohalic acid in an anhydrous organic medium, and treating the resulting reaction product, preferably in an aqueous medium, with a basic agent, as hereinafter defined, in order to demethylate the enolmethyl ether function in the 6 position of the thebaine.

The following theoretical explanation may be given for this conversion, but it is to be understood that this explanation is only theoretical and that the invention is not bound thereto. The thebaine molecule contains a system of two conjugated double bonds in the $\Delta^6$ and $\Delta^8$ positions. These double bonds, which constitute a conjugated 1-3 system, enable addition products to be obtained with dienophilic substances (cf. Sandermann, Ber. 71, 648 (1938); Schöpf and Coll., Ann. 536, 216 (1938)), but should also permit additions of the 1-4 type with other substances. It may be considered possible to fix an atom of hydrogen directly or indirectly in the 14 position of the thebaine molecule and to fix a hydrogen atom or a radical in the 6 position of the thebaine molecule such that it is then possible to liberate the keto group. The result obtained with hydrohalic acids appears to satisfy this expectation. It might be thought that the whole process takes place as if the halogen atom of the hydrohalic acid is added to the 6 position of the thebaine molecule, that is to say on the carbon atom carrying the methoxy group, while the hydrogen atom is added to the 14 position, the system thus created subsequently hydrolysing in the presence of a basic agent and resulting in the desired keto group. It is also possible that if the treatment by a basic agent is performed in an anhydrous medium the methyl group and halogen atom are removed by this agent.

In practice the first part of the reaction, that is to say the treatment of the thebaine by a hydrohalic acid, is carried out in an anhydrous medium in an organic diluent in which the thebaine and the thebaine hydrohalide which probably forms first may be suitably dispersed; this does not exclude the possibility of starting with a thebaine salt, for example its hydrochloride, and an appropriate diluent.

It is further desirable for the diluent to be a solvent for the hydrohalic hydride.

The percentage of the amount of thebaine used in relation to the amount of diluent used is advantageously between 1% and 30% and more particularly between 5% and 15%.

A suitable organic diluent is, for example, a member or mixture of members selected from the class of chlorinated hydrocarbons, particularly low-boiling-point chloro-alkanes, such as methylene chloride, chloroform, carbon tetrachloride, 1,2-dichloroethane and 1,1,2,2-tetrachloroethane, hydrocarbons particularly aromatic carbons such as benzene, ethers, particularly a di-lower-alkyl ether such as di-isopropyl ether, and di-n-butyl ether, and esters, such as ethyl acetate and β-ethoxy ethyl acetate.

While methylene chloride or chloroform, for example, may be successfully employed alone as a diluent, the best yields are generally obtained in diluents which are mixtures of compounds of the above class; thus where an ether is employed, it is desirable to employ a diluent which is a mixture of the same with a chlorinated hydrocarbon in which thebaine is soluble, whereby a homogeneous reaction mixture is provided.

The reaction is preferably carried out at a temperature between —20° C. and +30° C. for conveniency and with a view to securing good yields; a preferred range in practice is from —15° C. to +15° C. In any case the temperature should be above the freezing point of the diluent. In that connection it will be appreciated that by associating another diluent component with a diluent component such as benzene having a relatively high freezing point it is possible to make up a composite diluent having a satisfactory low freezing point.

The reaction period ranges generally from a few minutes to a few hours, specifically from about 2 minutes to about 5 hours. In any specific case it is easy to determine the best period by a few preliminary experiments.

The reaction time may vary considerably according to operating conditions. In particular, when anhydrous hydrochloric acid is used, the reaction time to obtain suitable results is generally between 15 minutes and 3 hours. When anhydrous hydrobromic acid is used, the reaction time may be reduced to a period of from 2 to 10 minutes.

This short reaction time with hydrobromic acid may enable a continuous process to be performed industrially.

The amount of hydrohalic acid to be employed is preferably not less than 3 moles and may be as high as 10 moles per each mole of thebaine. Where hydrobromic acid is employed, a suitable amount is from 3 to 5 moles. While like amounts are effective with hydrochloric acid, the reaction is slower and for best results it is preferred to employ an amount of hydrochloric acid of from 6 to 10 moles.

According to the nature of the diluent component or components and the concentrations of the reactants in the diluent, the reaction mixture is a one phase or a multiphase mixture; in the latter case it is desirable to stir the reaction mixture during the reaction period while in the first case stirring may be dispensed with although it may be useful.

It may be useful to carry out the reaction in the presence of an organic peroxide, particularly benzoyl peroxide.

With regard to the second step of the conversion, in practice it comprises treatment with a basic agent in an aqueous medium, although this does not exclude treatment in an anhydrous medium. The basic agent is preferably a mild alkaline agent, such as sodium bicarbonate, but other basic agents correctly diluted and used with precaution may be employed, for example alkali metal hydroxides, ammonia, alkaline-earth metal hydroxides and the corresponding carbonate and bicarbonates, salts having an alkaline action, such as sodium acetate, trisodium phosphate and organic bases such as dimethylamine or triethylamine.

The amount of basic agent should be such as to secure a pH of the range 8–12 for the final mixture.

In actual practice it is preferred firstly to neutralize the reaction mixture, preferably with sodium bicarbonate, then to adjust the pH to a value of the above range preferably by means of sodium hydroxide.

Isolation of the codeinone at the end of the reaction does not present any special difficulty. The product may be recrystallised if necessary from a suitable solvent.

The following examples illustrate the invention:

*Example 1*

Two litres of anhydrous isopropyl ether are introduced into a five-litre balloon flask provided with an agitator, a thermometer, a tube for the introduction of gas and a calcium chloride tube. The flask is cooled to $-15°$ C., and 400 g. of dry hydrochloric acid gas are introduced.

A solution of 500 g. of thebaine in 2300 ml. of methylene chloride is then introduced during 30 minutes and the temperature is allowed to rise to $+10°$ C. and this temperature maintained for 3 hours.

The reaction product is poured into a suspension of 940 g. of sodium bicarbonate in 3 litres of water. Finally, the pH is adjusted to 8 with a dilute soda solution.

The organic layer is decanted, the aqueous solutions are subjected to extraction first with one litre and then with 0.5 litre of methylene chloride, the extracts are combined, washed with water and dried on anhydrous sodium sulphate. The solvent is expelled in vacuo, the solid residue is diluted in 800 ml. of methanol, drained and dried in vacuo at 40° to 50° C.

255 g. of codeinone are obtained [melting point (block) 170° C.; $[\alpha]_D = -172°$ in 1% solution of absolute ethanol], of a purity of approximately 92%, which is equivalent to 232.5 g. of 100% product; the yield is thus about 48.7% of the theoretical value.

*Example 2*

124 g. of thebaine are dissolved in 600 ml. of methylene chloride. This solution is cooled to $-5°$ C. and a solution of 140 g. of dry hydrobromic acid in 600 ml. of dry isopropyl ether is rapidly added with agitation. The temperature rises to $+10°$ C. and is kept at this value for 5 minutes.

The mixture is poured with agitation into 1 litre of water containing 170 g. of sodium bicarbonate and the codeinone is isolated in a similar manner to that described in Example 1.

After washing with 200 ml. of iced methanol, draining and drying, 85 g. of codeinone are obtained (approximately 71% of the theoretical amount), with a melting point of 186° C. (Kofler bed) and a rotatory power $[\alpha]_D = 195°$; absorption in ultraviolet (c=$\frac{1}{10,000}$ in 96% methanol) at 280 m$\mu$ 0.585.

*Example 3*

The procedure of Example 2 is followed, but the isopropyl ether is replaced by an equal volume of methylene chloride and the process is carried out between $-10°$ and 0° C. 60 g. of codeinone are obtained (approximately 50% of the theoretical quantity; melting point= 183° C., $[\alpha]_D = -199°$; absorption in ultraviolet at 280 m$\mu$ 0.520 (c=$\frac{1}{10,000}$ in 96% ethanol).

*Example 4*

The procedure of Example 2 is followed, but the treatment with the basic agent is carried out with ammonia.

After washing with methanol, a codeinone having the following characteristics is obtained; melting point=183° C., $[\alpha]_D = -203°$; ultraviolet absoprtion at 280 m$\mu$ 0.500; quantity obtained 72 g., i.e. an approximate yield of 60%.

*Example 5*

70 g. of dry hydrobromic gas are dissolved in a mixture of 150 ml. of benzene and 150 ml. of isopropyl ether. This solution is added to a solution of 62 g. of thebaine and 0.1 g. of benzoyl peroxide in 300 ml. of dry benzene at a temperature of 0° C.$\pm$5° C. This temperature is maintained for 5 minutes. After neutralisation in a suspension of sodium bicarbonate, the codeinone is isolated in a similar manner to that indicated in Example 1. 24 g. of 92% codeinone are obtained [melting point (block)= 170° C.; $[\alpha]_D = -174°$], corresponding to 22.1 g. of 100% codeinone (yield 37%).

*Example 6*

85 g. of dry hydrobromic gas are dissolved in a mixture of 150 ml. of chloroform and 150 ml. of isopropyl ether. This mixture is added to a solution of 62 g. of thebaine in 300 ml. of chloroform. The resulting product is kept at a temperature of $-5°$ C. for 2 minutes, and then the alkaline treatment of the reaction product and isolation of the thebaine in a similar manner to that indicated in Example 1 are immediately carried out.

42.5 g. of 95% codeinone are obtained [melting point=175° C. (tube); $[\alpha]_D = -192°$] equivalent to 40.4 g. of 100% codeinone (approximate yield 67.6%).

*Example 7*

45 g. of dry hydrobromic gas are dissolved in 300 ml. of chloroform at $-30°$ C. This solution is added to 40 g. of thebaine in 200 ml. of chloroform. The resulting product is kept at a temperature of $-10°$ C. for 5 minutes; this is immediately followed by alkaline treatment of the reaction product and isolation of the thebaine in a similar manner to that indicated in Example 1.

After washing with methanol and drying, 20 g. of codeinone are isolated [melting point=184° C. (block); $[\alpha]_D = -202°$]. The yield is approximately 52%.

*Example 8*

A solution of 130 g. of dry hydrobromic gas is introduced into a solution of 124 g. of thebaine in 600 ml. of methylene chloride. The reaction temperature is between $-10°$ and 0° C. The reaction is allowed to continue for 5 minutes. After neutralisation with sodium bicarbonate, 60 g. of 97.7% codeinone are isolated [melting point=183° C.; $[\alpha]_D=-199°$; ultraviolet absorption at 280 m$\mu$ 0.520], i.e. yield of 49.1%.

*Example 9*

The procedure of Example 2 is followed, but in this case the thebaine solution is added to the hydrobromic acid solution.

72 g. of codeinone are obtained [melting point (block)=185° C.; $[\alpha]_D$ −197°], corresponding to a yield of 60.3%.

*Example 10*

40 g. of anhydrous hydrobromic gas are dissolved in 150 ml. of dry ethyl acetate in the cold state. This solution is rapidly added to a solution of 31 g. of thebaine and 0.05 g. of benzoyl peroxide in 150 ml. of methylene chloride. After 5 minutes reaction at 10° C. the mixture is neutralised by pouring it into an aqueous solution of sodium bicarbonate. The pH is adjusted to 8 with dilute caustic soda solution and the codeinone is isolated as in Example 1. 17 g. of 96% codeinone are obtained [melting point (block)=182° C.; $[\alpha]_D=-197°$; absorption in ultraviolet at 280 m$\mu$ 0.502], which is equivalent to 16.3 g. of 100% product (yield 54.7%).

*Example 11*

140 g. of dry hydrobromic gas are dissolved in 600 ml. of di-n-butyl oxide. The solution is added to 124 g. of thebaine (left in contact with air for some days) dissolved in 600 ml. of methylene chloride. The reaction is allowed to continue for 5 minutes at 0° C., the reaction product is poured into an aqueous solution of sodium bicarbonate, and the codeinone is isolated in a similar manner to that described in Example 1. 93 g. of codeinone are obtained [melting point (block)=175° C.; $[\alpha]_D=-183°$] of a purity of 90%, which is equivalent to 83.7 g. of pure product, i.e. a yield of 79% approximately.

*Example 12*

The procedure of the previous example is followed but the treatment with a basic agent is effected with ammonia. 70 g. of codeinone are obtained [melting point (block)=179° C. $[\alpha]_D=-196°$], which is equivalent to 66.5 g. of 100% product, i.e. a yield of about 55.8%.

*Example 13*

40 g. of hydrobromic gas are dissolved in 150 ml. of β-ethoxy ethyl acetate. The solution is added to a solution of 31 g. of thebaine and 0.05 g. of benzoyl peroxide in 150 ml. of methylene chloride. The reaction is allowed to take place with agitation for 5 minutes at +10° C. The reaction product is poured into an aqueous suspension of sodium bicarbonate and the codeinone is isolated in a similar manner to that described in Example 1. 20.5 g. of codeinone are obtained [melting point (block)=177° C.; $[\alpha]_D=-197°$; ultraviolet spectrum (1/10,000 in 96% ethanol) 0.465 at 280 m$\mu$].

*Example 14*

40 g. of dry hydrobromic gas are dissolved in 150 ml. of isopropyl ether. The solution is rapidly added to 49 g. of thebaine hydrobromide and 0.05 g. of benzoyl peroxide in 240 ml. of methylene chloride. After 5 minutes agitation at 10° C. the mixture is poured into an aqueous suspension of sodium bicarbonate and the pH is adjusted to 8. After isolation and purifying as in Example 1, 25 g. of codeinone are obtained, of a purity of about 95%; melting point (block)=180° C. $[\alpha]_D$ −195° (1% in 96% ethanol). The yield is therefore about 65%.

*Example 15*

The procedure of Example 2 is followed, but the treatment with a basic agent is effected by pouring the reaction product into an aqueous solution of dimethylamine. Approximately 20 g. of about 80% codeinone are obtained.

*Example 16*

In an enamelled Grignard vessel having a capacity of 250 litres, 10 kg. of thebaine were dissolved in 75 litres of dry methylene chloride. The solution was cooled to −10° C. by passing brine through the jacket of the vessel. While stirring, 13.5 kg. of hydrogen bromide dissolved in 25 litres of dry di-n-butyl oxide were quickly added. The temperature rose to +5° C. and was maintained for 5 minutes. The mass was poured into a stainless steel Grignard vessel containing 75 litres of water, 18 kg. of sodium bicarbonate and 50 kg. of crushed ice. The pH was adjusted to 9 by means of caustic soda. The organic layer was decanted, the aqueous layer extracted three times with 20 litres of methylene chloride, the joined organic layers washed twice with water and dried over anhydrous sodium sulphate.

The filtered solutions were concentrated in vacuo. Several batches of crude codeinone (total weight of 8.575 kg.) were obtained; they were diluted in 12 litres of cold methanol, and after filtering and drying yielded 7.390 kg. of about 96% codeinone; yield about 74.2%; melting point 178° C. $[\alpha]_D=-200°$.

*Example 17*

40 g. of dry hydrogen bromide were dissolved in 150 mol of isopropyl ether. The solution was quickly added to a solution of 49 g. of thebaine hydrobromide in 240 ml. of methylene chloride. After stirring for 5 minutes at 10° C. the mass was poured into an aqueous suspension of sodium bicarbonate, and the pH adjusted to 8. By isolating and purifying as described in Example 1, 21.4 g. of about 95% codeinone were obtained; melting point (block) 181° C.; $[\alpha]_D=-195°$ (1% in 96% ethyl alcohol); yield 55.6%.

I claim:
1. In the production of codeinone from thebaine, the step of reacting thebaine with a hydrohalic acid in an anhydrous organic medium which is inert under the conditions obtaining.
2. In the production of codeinone from thebaine, the step of reacting thebaine with a hydrohalic acid selected from the class consisting of hydrochloric acid and hydrobromic acid in a molar proportion of the range 1:3 to 1:10 in an anhydrous organic diluent which is inert under the conditions obtaining at a temperature of the range −20° C. to +30° C. which lies above the freezing point of said diluent.
3. In the production of codeinone from thebaine, the step of reacting thebaine with a hydrohalic acid selected from the class consisting of hydrochloric acid and hydrobromic acid in a molar proportion of the range 1:3 to 1:10 in an anhydrous organic diluent which is inert under the conditions obtaining, the proportion by weight of said diluent ranging from 100:30 to 100:1 with respect to thebaine, at a temperature of the range −20° C. to +30° C. which lies above the freezing point of said diluent, for a period from 2 minutes to 5 hours.
4. In the production of codeinone from thebaine, the step of reacting thebaine with a hydrohalic acid selected from the class consisting of hydrochloric acid and hydrobromic acid in a molar proportion of the range 1:3 to 1:10 in an anhydrous organic diluent which is a mixture of a low-boiling chloroalkane with a di-lower-alkyl ether, at a temperature of the range −20° C. to +30° C. which lies above the freezing point of said diluent, for a period from 2 minutes to 5 hours.
5. A method for the production of codeinone from thebaine, which comprises the successive steps of reacting thebaine with a hydrohalic acid in an hydrous organic medium which is inert under the conditions obtaining and treating the resulting reaction product with a basic agent.
6. The method of claim 5, said treatment with a basic agent being effected in an aqueous medium.
7. The method of claim 5, said treatment with a basic agent being effected with so much of said agent in aqueous medium as to obtain a final mixture having a pH of the range 8-12.

8. A method for the production of codeinone from thebaine, which comprises the successive steps of reacting thebaine with a hydrohalic acid selected from the class consisting of hydrochloric acid and hydrobromic acid in a molar proportion of the range 1:3 to 1:10 in an anhydrous organic diluent which is inert under the conditions obtaining at a temperature of the range $-20°$ C. to $+30°$ C., which lies above the freezing point of said diluent, and treating the resulting reaction product with a basic agent.

9. The method of claim 8, said treatment with a basic agent being effected in an aqueous medium.

10. A method for the production of codeinone from thebaine, which comprises the successive steps of reacting thebaine with a hydrohalic acid selected from the class consisting of hydrochloric acid and hydrobromic acid in a molar proportion of the range 1:3 to 1:10 in an anhydrous organic diluent which is inert under the conditions obtaining, the proportion by weight of said diluent ranging from 100:30 to 100:1 with respect to said thebaine at a temperature of the range $-20°$ C. to $+30°$ C., which lies above the freezing point of said diluent for a period of from 2 minutes to 5 hours, and treating the resulting reaction product with so much of a basic agent in an aqueous medium as to obtain a final mixture having a pH of the range 8-12.

11. The method of claim 10, the second step thereof comprising neutralizing the reaction mixture thus obtained then adjusting the neutral mixture to a pH of the range 8-12.

12. A method for the production of codeinone from thebaine, which comprises the successive steps of reacting thebaine with a hydrohalic acid selected from the class consisting of hydrochloric acid and hydrobromic acid in a molar proportion of the range 1:3 to 1:10 in an anhydrous organic diluent which is inert under the conditions obtaining, the proportion by weight of said diluent ranging from 100:30 to 100:1 with respect to said thebaine, for a period of from 2 minutes to 5 hours, adding so much of an aqueous solution of sodium bicarbonate to the reaction mixture thus obtained to neutralize the same then adding so much of an aqueous solution of sodium hydroxide to the neutralized mixture to adjust the pH thereof to a value of the range 8-12.

References Cited in the file of this patent

UNITED STATES PATENTS

| | | |
|---|---|---|
| 2,741,613 | Clark | Apr. 10, 1956 |
| 2,797,222 | Couroy | June 25, 1957 |
| 2,797,223 | Couroy | June 25, 1957 |

OTHER REFERENCES

Groggins: Unit Processes in Organic Chemistry, Third Edition, pages 215-17 (1947).

Schopf et al.: Annalen, volume 458, pages 148-179 (1927) (pages 159-162 relied on).

Knorr: Ber., Deut. Chem., volume 39, pages 1409-1414 (1906).